June 27, 1967     C. J. BROWN     3,328,741

TRAILER HITCH WITH MULTIPLE ELECTRICAL CONNECTIONS

Filed Feb. 23, 1965

United States Patent Office 3,328,741
Patented June 27, 1967

3,328,741
TRAILER HITCH WITH MULTIPLE ELECTRICAL
CONNECTIONS
Clyde J. Brown, Paso Robles, Calif., assignor of one-half
to Mike M. Barajas, Atascadero, Calif.
Filed Feb. 23, 1965, Ser. No. 434,268
5 Claims. (Cl. 339—7)

ABSTRACT OF THE DISCLOSURE

A trailer hitch comprising a metallic ball pin and a socket resting thereon and locked thereto, the ball having at least four electrical contact segments insulated from the ball and socket, two segments being in the upper quadrant and two near or below the equator, all extending circumferentially of the ball through about 75° and having extended vertical dimensions to maintain electrical contacts with radial brushes carried by the socket despite rotational and tilting motions.

---

The invention relates to improvements in couplings between a tractor vehicle and a towed vehicle which provides at least four electrical connections between said vehicles, in addition to the ground circuit that may be provided by the direct contact of the structural surfaces of the coupling elements, each of said elements being adapted for rigid connection to a different one of said vehicles. More specifically, the invention provides, in addition to the thrust-transmitting characteristics of a coupling that includes a ball pin and a socket enclosing the head of said pin, internal electrical contact elements that are effective despite relative movements of the coupling elements to provide at least four separate electrical circuits between the said vehicles.

In one application of the invention the said circuits are utilized to energize at least four electrical appliances or groups of appliances on the towed vehicle, herein for convenience called the trailer, from control devices on the tractor or towing vehicle: (1) a tail light, optionally connected in parallel circuit with clearance lights, (2) a stop light, optionally connected in parallel circuit with the solenoid of a trailer brake, (3) a right-turn directional indicator light, and (4) a left-turn directional indicator light.

It is known to include electrical circuits within such couplings (see, e.g., U.S. Patents 2,564,520 and 2,673,-965). However, known couplings have only provided a small number of electrical circuits, less than four, and it was not possible with the known arrangements of parts to accommodate as many as four separate circuits. This has led to the practice of runing separate cables or wires between the tractor and trailer which has resulted in failures of the appliances or signaling devices due to damage of the wires and/or oversights on the part of the operator of the vehicles.

A particular problem which limits the number of separate electrical circuits that could be provided by prior devices having articulated elements secured to the respective vehicles has been that the electrical contacts of all circuits must be continuous and no short-circuiting (as by contact with the structural elements) may occur despite relative turning and tilting movements of said elements due to behaviour of the vehicles on encountering deviations in the road surface. Thus, the ball pin and the socket of the hitch turn relatively through an angle greater than 90° (over 45° to each side of the normal relation when the vehicles move along a straight road) and, further, there occurs a tilting motion between the vertical axes of the ball pin and the socket about the longitudinal and transverse axes when there is a change in the transverse slope or the grade of the roadway. Hence it is necessary to accommodate both rotational relative movements between the hitch elements about the vertical axis and tilting relative movements about the longitudinal and transverse axes. This requirement has heretofore limited the number of electrical circuits that could be feasibly accommodated.

Apropos of the previously mentioned difficulty, it should be noted that arbitrary placement of the contacting members was not simple because the coupling elements at all times are in both vertical and horizontal thrust-transmitting relation, despite relative movements previously indicated. Hence it is essential to devise a placement of the parts that provides continuous structural transmission of thrust while preventing spurious electrical contacts.

A further drawback of known couplings that provided electrical connections has been their complexity. Most such devices have employed a spring-loaded contact element within the head of the ball pin and/or especially shaped inserts mounted within the ball pin head. These were subject to malfunctioning due to wear or dislocation and were costly to produce.

Now, in accordance with the present invention, there is provided a coupler that includes a ball pin and a socket relatively movable to the pin and enclosing its head, each of said elements being adapted to be attached to one or the other of said vehicles, which provides at least four separate electrical circuits, all insulated from the structural parts of the coupler, while permitting large rotational movements about the vertical axes and limited tilting movements in any direction between said axes of the pin and socket, which affords continuing vertical and horizontal structural support between said pin and socket; and, further, the complexity of the coupler is reduced and the parts are arranged for simplicity and durability.

The improved trailer hitch according to the invention provides, on the substantially spherical head of the ball pin, at least four electrically conductive contact segments that are rigidly fixed to the pin, e.g., by means of an insulating poting resin, and have spherical outer faces, and the socket has at least four corresponding, axially movable brushes that are pressed resiliently against the said segments (the term "axially" having reference to the brush movements, which are generally perpendicular to said outer faces). The said segments are shaped to permit the previously mentioned relative rotational and tilting motions between the pin and socket while maintaining said brushes in electrical contact with only its mating contact segment.

In the preferred embodiment to be described, there are provided, on the head of the ball pin, two pairs of contact segments including two segments situated one on each side of a plane passing through the said vertical axis, one of said pairs being situated at the upper end of the head and the other pair being constituted by metallic bands extending about the head at the equator thereof, preferably throughout an area situated both above and below the equator of the head.

Each of the conductive contact segments is connected electrically to a wire that passes through a bore or passageway formed within the head and pin, and is connected either directly or through a disconnect fixture to the electrical fixtures on the corresponding vehicle, e.g., controlling electrical elements. Similarly, each brush is connected to a separate wire that is correspondingly connected to the controlling fixture of switch on the other vehicle.

The spherical outer surfaces of the said conductive contact segments, which are engaged by the corresponding brushes, are concentric with the spherical outline of the ball pin head, which is in mechanical engagement with the socket. Preferably, the said surfaces of the segments have different radii smaller than the head radius, i.e., the outer surfaces of the segments are preferably recessed. However, these surfaces may be co-extensive with the outline of the head or, by forming the socket so as to avoid any possibility of electrical contact with any segment upon normal or expected rotational or tilting movement, the segments can have radii greater than that of the head.

By fixing the several contact segments rigidly to the ball pin head through insulation material no relatively moving parts occur in the ball pin; this results in increased durability of the ball pin.

The brushes mounted within the socket are preferably arranged along a common arcuate line that has its center at the center of said spherical outline of the ball pin head when the parts are interconnected, and the brushes are radially movable relatively to said outline. For example, the said arcuate line is situated in a vertical plane that is transverse to the draft line between the conjoined vehicles. The brushes are, advantageously, accessible from the outside of the socket for servicing or replacement. The several wires connected to the brushes may extend through passageways formed within the fixture or may extend externally to the fixture and be protected against physical damage by a cover.

Having indicated the general nature of the invention, reference is made to the accompaning drawing forming a part of this specification and showing a preferred embodiment of the invention, wherein.

Figure 1:
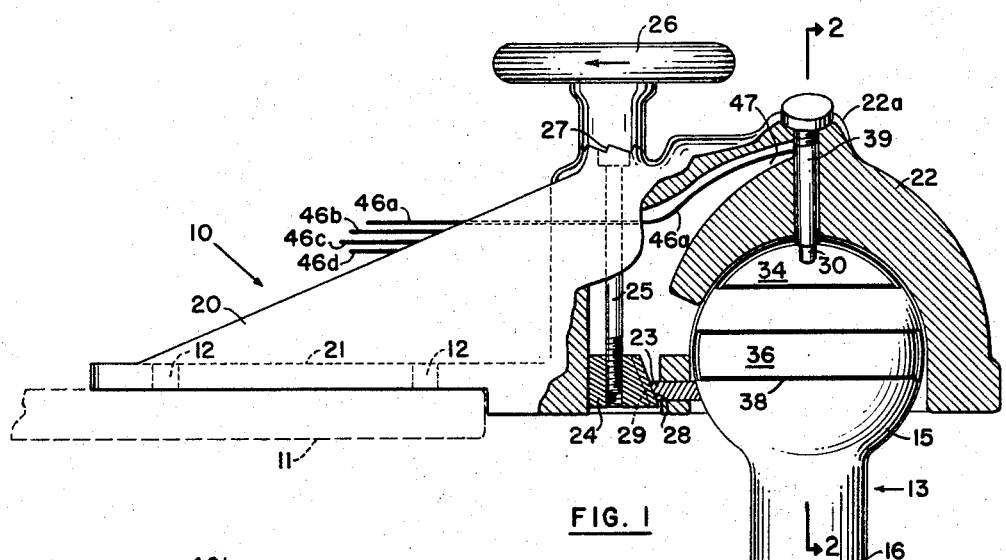
FIGURE 1 is a side elevational view of the trailer hitch, shown partly in section.

Referring to the drawing in detail, the trailer hitch comprises a socket fixture 10, adapted for rigid connection to one or the other of the vehicles, e.g., to a part 11 such as the drawbar of the trailer, by bolts extending through holes 12 of the base plate of the fixture, and a ball pin 13 adapted for rigid attachment to the other vehicle, e.g., through a bracket 14 secured to the tractor. The pin 13 includes a head 15 of substantially spherical outline and an integral stem 16 having a positioning flange 17 and an externally threaded projection 18 beneath the flange for receiving a nut 19 by which the pin is clamped to the tractor bracket 14.

The fixture 10 includes, at its sides, vertical, longitudinal bracing walls 20 integral with a flat, horizontal base plate 21 and has at its end a socket 22. The socket is shaped to receive the spherical head 15 and has inwardly directed surfaces or projections situated substantially on a spherical surface for engaging the parts of the head other than the contact segments thereof, to be described, while permitting rotational and tilting relative movements. In the embodiment illustrated the upper part of the socket is continuous to afford vertical support from the head. The head is secured within the socket by suitable locking means, such as a longitudinally slidable, horizontal locking plate 23 having an end surface curved to conform to that of the pin head, which it engages below its equator. The locking plate has cam surfaces which engage upwardly and rearwardly inclined cam surfaces on a block 24 that has a rectangular outline and is vertically slidable within a rectangular well formed in the fixture 10. The block is threadedly engaged to a rod 25 which is fixed rotationally to a handwheel 26 having serrations 27 along the downward face of an annular rim, the serrations mating with correspondingly shaped serrations on the fixture 10. The block may be urged downwards by a coiled compression spring, not shown. The block has an inclined cam face 28 which urges the plate 23 toward the ball pin head when the block is raised, and an inclined flange 29 which engages a part of the plate to urge it away from said head when the block is lowered. The part 28 and 29 are duplicated on opposite sides of the block. The said spring and details of the engagement between the block and plate are not shown because the elements described heretofore are known per se, e.g., from U.S. Patents Nos. 2,197,267 and 2,237,031.

Now according to the invention, the socket fixture 10 carries a plurality of at least four axially movable brushes 30–33, and the ball pin head carries a corresponding plurality of electrically conductive contact segments 34–37, e.g., of copper or bronze, rigidly fixed to the head 15 within recesses by electrically insulating bonding material, such as potting resin, indicated at 38. The outer surfaces of these segments may be recessed, as shown, to avoid electrical contact with the socket, although this is not essential when the socket has recessed regions to attain the same purpose. The segments are preferably arranged in two pairs, of which the upper pair 34, 35, is situated substantially at the upper end of the head and the other pair, 36, 37, extends circumferentially about most of the head above the meridian at which the locking plate 23 engages the head during any normal or likely tilting of the pin to avoid contact therewith. The segments 36 and 37 are preferably situated at or just above the equator of the head. Further, the members of each pair of segments are preferably situated, respectively, on opposite sides of a plane passing through the vertical axis of the head. Further, the upper segments 34 and 35 are spaced apart sufficiently to leave an intervening band 15a of the head therebetween for transmitting vertical thrust by engagement with the socket. This band thus provides a bearing area.

Each segment extends circumferentially through an arc greater than about 90°, preferably greater than 150°, to permit relative rotational movement between the socket and pin head about their vertical axes throughout angles one-half of the stated angles from the normal relation without loss of contact with their respective brushes. Further, the segments have vertical dimensions or angular heights such that said vertical axes can assume canted or tilted relations throughout limited angles, e.g., 10° or more in the plane of FIGURE 2 (i.e., about the draft line between the vehicles from the normal relation when both vehicles are on a flat roadway without loss of contact with the brushes. Tilting about the transverse axis (due to differences in the grade of the roadway) are accommodated when both of these requirements are met.

The outer surfaces of the contact segments advantageously are spherically concentric with the head 15 and may be recessed or coextensive therewith, as previously indicated.

The brushes 30–33 are mounted in any suitable manner that insulates them electrically from the socket fixture. For example, they can be axially slidable within insulating tubular sleeves 39, e.g., made of resin or plastic, that are fitted within radial bores formed in the socket 22 and are secured thereto by frictional engagement or by threads shown at 40. The socket may have a thickened portion, extending along a transverse arc, to provide the said radial bores for the tubes 39, which are preferably situated in a common plane extending transversely to the draft line between the vehicles, and passing through the sphere center of the socket. Thereby the said brushes are situated in a common arcuate line.

The tubes 39 are closed by caps 41. Any suitable material may be used for the brushes, e.g., carbon, metal or sintered metal filled with conductive powder. According to a commercially available tube assembly, each tube contains a coiled compression spring 42 acting between the brush and a slidable plug 43 which presses the brush radially inwardly against its contact segment, and the inward movement of the brush is limited by a peripheral flange 45 on the brush that engages an inwardly directed flange 45 on the tube to prevent expulsion of the brush. Each brush is connected to a separate insulated wire 46a–46d that may, for example, be inserted laterally into the tube to make electrical contact with the plug 43. These wires may extend thence through the fixture 10 via passageways formed therein, as shown at 47, to the electrical fixtures on the trailer, e.g., as previously indicated, directly or through a disconnect fixture. It is to be understood that any other arrangement suitable for ataching the wires to the brushes and extending them through or over the fixture 10 may be used.

The ball pin is provided with a central, axial bore 48 having branches 49–52 that extend to the undersides of the contact segments 34–37. Insulated electrical wires 54a–54d extend through these bores and are fixed and electrically bonded, e.g., soldered, to the respective segments. They extend out from the bottom of the ball pin, from where they may be secured to the bracket 14 and connected either directly or through a disconnect fixture to the control switches or devices on the tractor vehicle which supply electrical power.

Figure 2:
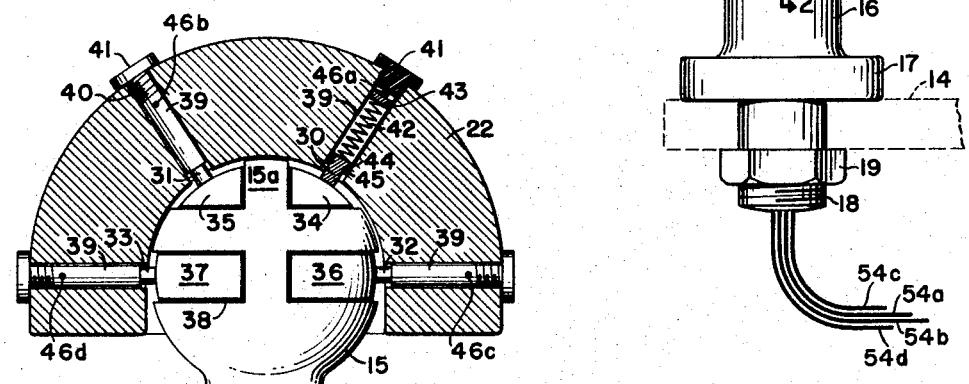
FIGURE 2 is a transverse sectional view, taken on the line 2—2 of FIGURE 1, the ball pin head being shown partly in elevation.
Figures 3, 4:
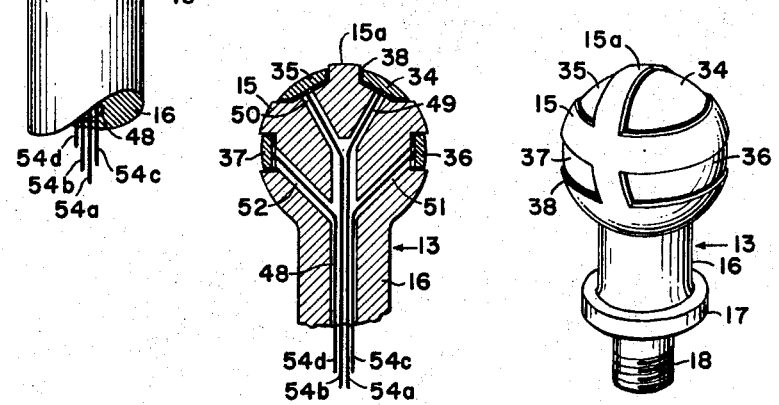
FIGURE 3 is a sectional view through the head of the ball pin, shown on a reduced scale.
FIGURE 4 is a perspective view of the ball pin.

In operation, the metallic parts of the ball pin head 15—other than the contact segments 34–37—make continuous electrical contact with some parts of the metallic socket fixture 10, whereby the two vehicles are electrically connected via the parts 11 and 14 and their chassis form a common ground circuit. When the hitch is attached as shown in FIGURES 1 and 2, the ball pin can rotate within the socket throughout angles of well over 75° to each side of the normal position illustrated without loss of electrical contacts between the brushes and the respective contact segments. This exceeds the likely relative angular motion of the trailer relatively to the tractor. Further, because each contact segment has an appreciable angular height about the center of the spherical surfaces, the brushes remain in contact with the segments even though the vertical axes of the socket and head are relatively inclined, e.g., over 10° on each side of their normal relation, as could be caused by irregularities in the roadway causing relative transverse tilting of the two vehicles in opposite directions.

I claim as my invention:

1. A trailer hitch which provides at least four electrical connections insulated therefrom for securing a tractor vehicle to a towed vehicle, which comprises:
  (a) a metallic ball pin including a head the major part of which has a substantially spherical outline adapted for attachment to one of said vehicles and containing at least one passageway for receiving electrical conductors,
  (b) at least four electrical contact segments insulated electrically from said metallic ball pin head and rigidly fixed thereto, said segments having exterior surfaces substantially spherical about the center of said spherical outline of the head, extending horizontally through arcs greater than about 90° and having extended vertical dimensions, one pair of segments being situated at the upper end of the head and another pair having portions thereof near the equator of the head, one segment of each pair being situated on one side and the other on the other side of a plane passing through the vertical axis of the ball pin,
  (c) a socket substantially enclosing the major part of said head for transmitting mechanical thrust to said ball pin and adapted for attachment to the other of said vehicles, said socket including means securing said head therein by engagement wholly below said equator and being in vertical thrust-transmitting relation thereto and out of electrical contact with said contact segments throughout relative turning movement of the ball pin and the socket about a vertical axis and throughout limited relative inclinations of the vertical axes of said ball pin and said socket about the longitudinal draft line of said conjoined vehicles,
  (d) at least four brushes mounted in said socket and electrically insulated therefrom and positioned to make sliding contacts with different ones of said segments,
  (e) said brushes being movable in directions approaching said surfaces of the contact segments and being provided with resilient means urging the brushes into engagement with said segments,
  (f) at least four electrical conductors insulated from each other and from said ball pin and connected respectively to said segments and extending through said passageway, and,
  (g) separate electrical conductors insulated from said socket and from each other connected respectively to said brushes.

2. A trailer hitch as defined in claim 1 wherein said exterior surfaces of said contact segments are radially recessed relatively to the said spherical outline of the head of the ball pin.

3. A trailer hitch as defined in claim 1 wherein the contact segments situated in the upper end of the head are spaced apart on opposite sides of said plane by a substantial distance, and said head includes an integral band extending between the said contact segments and providing a bearing area adapted to engage the socket in vertical thrust-transmitting relation.

4. A trailer hitch as defined in claim 1 wherein the segments situated in the upper end of the head have areal outlines that are substantially segments of circles, and the other contact segments are substantially bands extending circumferentially about the head throughout arcs greater than 150° and substantially at the equator of said head.

5. A trailer hitch as defined in claim 1 wherein said brushes are situated substantially in a common arcuate line, said line being situated in a plane that passes through said center of the spherical outline and is substantially transverse to the said draft line.

References Cited

UNITED STATES PATENTS

| | | | |
|---|---|---|---|
| 1,926,264 | 9/1933 | Connors | 280—422 |
| 3,060,417 | 10/1962 | Blake | 339—89 X |
| 3,116,940 | 1/1964 | Jines | 339—7 X |

FOREIGN PATENTS

| | | |
|---|---|---|
| 381,354 | 10/1932 | Great Britain. |
| 613,246 | 11/1948 | Great Britain. |

MARVIN A. CHAMPION, *Primary Examiner.*

ALFRED S. TRASK, *Examiner.*

P. TEITELBAUM, *Assistant Examiner.*